US011909775B2

(12) United States Patent
Sun et al.

(10) Patent No.: US 11,909,775 B2
(45) Date of Patent: Feb. 20, 2024

(54) METHODS AND APPARATUSES FOR ENHANCEMENT TO IP MULTIMEDIA SUBSYSTEM

(71) Applicant: Telefonaktiebolaget LM Ericsson (publ), Stockholm (SE)

(72) Inventors: Min Sun, Shanghai (CN); Fang Li, Shanghai (CN); Yunjie Lu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/988,327

(22) Filed: Nov. 16, 2022

(65) Prior Publication Data
US 2023/0071920 A1   Mar. 9, 2023

Related U.S. Application Data

(62) Division of application No. 17/262,894, filed as application No. PCT/CN2018/098006 on Aug. 1, 2018, now Pat. No. 11,509,696.

(51) Int. Cl.
*H04L 65/1016* (2022.01)
*H04L 65/1069* (2022.01)
(Continued)

(52) U.S. Cl.
CPC ...... *H04L 65/1016* (2013.01); *H04L 65/1045* (2022.05); *H04L 65/1069* (2013.01); *H04L 67/567* (2022.05); *H04M 15/66* (2013.01)

(58) Field of Classification Search
CPC .......... H04L 65/1016; H04L 65/1069
See application file for complete search history.

(56) References Cited

U.S. PATENT DOCUMENTS 8,369,311 B1 * 2/2013 Kirchhoff ......... H04M 3/42263
370/352
8,594,105 B1 * 11/2013 Breau ................. H04L 65/1069
370/469
(Continued)

FOREIGN PATENT DOCUMENTS

| CN | 101159923 A | 4/2008 |
| CN | 101836420 A | 9/2010 |

(Continued)

OTHER PUBLICATIONS

3rd Generation Partnership Project, "3rd Generation Partnership Project; Technical Specification Group Core Network and Terminals; IP Multimedia Call Control Protocol Based on Session Initiation Protocol (SIP) and Session Description Protocol (SDP); Stage 3 (Release 12)", Technical Specification, 3GPP TS 24.229 V12.3.0, Dec. 1, 2013, pp. 1-821, 3GPP.

(Continued)

*Primary Examiner* — Philip C Lee
(74) *Attorney, Agent, or Firm* — COATS & BENNETT, PLLC (57) ABSTRACT

Methods and apparatuses are disclosed for enhancement to an internet protocol (IP) multimedia subsystem (IMS). According to an embodiment, an application server (AS) of the IMS receives from a terminal device a first request for initiating a call service and an internet service which are to be integrated with each other. The AS of the IMS sends a second request for initiating the internet service to a gateway server that acts as a gateway to an internet AS capable of providing the internet service. In response to a reply from the gateway server, the AS of the IMS handles the first request based on the reply.

18 Claims, 6 Drawing Sheets

(51) Int. Cl.
*H04M 15/00* (2006.01)
*H04L 65/1045* (2022.01)
*H04L 67/567* (2022.01)

(56) References Cited

U.S. PATENT DOCUMENTS

| | | | | |
|---|---|---|---|---|
| 8,688,842 | B2* | 4/2014 | Rasanen | H04L 61/2578 |
| | | | | 709/227 |
| 10,326,605 | B2* | 6/2019 | Rivas Molina | H04W 4/16 |
| 2003/0040280 | A1* | 2/2003 | Koskelainen | H04W 24/04 |
| | | | | 455/67.11 |
| 2006/0286984 | A1* | 12/2006 | Bonner | H04W 36/14 |
| | | | | 455/445 |
| 2007/0076691 | A1* | 4/2007 | Varney | H04L 61/4588 |
| | | | | 370/352 |
| 2007/0220573 | A1* | 9/2007 | Chiussi | H04L 12/189 |
| | | | | 725/114 |
| 2008/0120425 | A1* | 5/2008 | Beyer | H04L 69/08 |
| | | | | 709/230 |
| 2008/0120697 | A1* | 5/2008 | Beyer | H04L 63/0869 |
| | | | | 726/4 |
| 2008/0120705 | A1* | 5/2008 | Beyer | H04L 65/1104 |
| | | | | 726/5 |
| 2008/0192770 | A1* | 8/2008 | Burrows | H04L 65/104 |
| | | | | 370/466 |
| 2008/0276068 | A1* | 11/2008 | Ashraf | H04L 65/1043 |
| | | | | 710/1 |
| 2008/0301747 | A1* | 12/2008 | Yan | H04L 67/1021 |
| | | | | 725/118 |
| 2009/0003380 | A1* | 1/2009 | Jackson | H04L 65/1069 |
| | | | | 370/466 |
| 2009/0287740 | A1* | 11/2009 | Banerjee | H04L 65/40 |
| 2010/0135278 | A1* | 6/2010 | Dingler | H04M 3/42374 |
| | | | | 370/352 |
| 2010/0279666 | A1 | 11/2010 | Small et al. | |
| 2011/0047282 | A1* | 2/2011 | Denman | H04L 65/765 |
| | | | | 709/231 |
| 2011/0224969 | A1* | 9/2011 | Mulligan | G06F 40/58 |
| | | | | 704/235 |
| 2011/0296518 | A1* | 12/2011 | Faynberg | H04L 63/0815 |
| | | | | 726/13 |
| 2012/0246212 | A1* | 9/2012 | Ahmad | H04L 65/4046 |
| | | | | 709/201 |
| 2014/0222893 | A1* | 8/2014 | Gangadharan | H04L 65/1069 |
| | | | | 709/203 |
| 2014/0222957 | A1* | 8/2014 | Gangadharan | G06F 8/31 |
| | | | | 709/217 |
| 2019/0253931 | A1* | 8/2019 | Xin | H04W 24/02 |

FOREIGN PATENT DOCUMENTS

| | | | | |
|---|---|---|---|---|
| CN | 102739609 A | 10/2012 | | |
| CN | 106489275 A | 3/2017 | | |
| EP | 2059002 B1 | 12/2010 | | |
| WO | WO-2004075507 A2 * | 9/2004 | ....... | H04L 29/12009 |
| WO | WO-2005120003 A1 * | 12/2005 | ......... | H04L 65/1069 |
| WO | WO-2007073602 A1 * | 7/2007 | ......... | H04L 65/1006 |
| WO | WO-2008028437 A1 * | 3/2008 | ............. | H04L 63/08 |
| WO | WO-2008054270 A1 * | 5/2008 | ......... | H04L 12/2818 |
| WO | 2008089845 A1 | 7/2008 | | |
| WO | WO-2008089845 A1 * | 7/2008 | ............. | H04L 67/16 |
| WO | 2009051527 A1 | 4/2009 | | |
| WO | WO-2009051527 A1 * | 4/2009 | ............. | H04L 12/14 |
| WO | 2010059120 A1 | 5/2010 | | |
| WO | WO-2010059120 A1 * | 5/2010 | ........... | G06F 17/289 |
| WO | WO-2012095165 A1 * | 7/2012 | ....... | H04L 29/06176 |
| WO | WO-2013156089 A1 * | 10/2013 | ........ | H04W 36/0022 |
| WO | 2013164040 A1 | 11/2013 | | |
| WO | WO-2013164040 A1 * | 11/2013 | ........... | H04L 65/1006 |
| WO | WO-2014187492 A1 * | 11/2014 | ......... | H04L 41/0893 |
| WO | WO-2016111603 A1 * | 7/2016 | ........ | H04L 61/3075 |

OTHER PUBLICATIONS

3rd Generation Partnership Project, "3rd Generation Partnership Project; Technical Specification Group Core Network and Terminals; Conferencing Using the IP Multimedia (IM) Core Network (CN) Subsystem; Stage 3 (Release 12)", Technical Specification, 3GPP TS 24.147 V12.1.0, Dec. 1, 2013, pp. 1-209, 3GPP.

Khlifi, H. et al., "IMS Application Servers: Role, Requirements, and Implementation Technologies", IEEE Internet Computing, vol. 12 No. 3, May 1, 2008, pp. 40-51, IEEE.

* cited by examiner

METHODS AND APPARATUSES FOR ENHANCEMENT TO IP MULTIMEDIA SUBSYSTEM

RELATED APPLICATIONS

The present application is a divisional of U.S. patent application Ser. No. 17/262,894, which was filed on Jan. 25, 2021, which is a national stage application of PCT/CN2018/098006, which was filed Aug. 1, 2018, the disclosures of each of which are incorporated herein by reference in their entirety.

TECHNICAL FIELD

Embodiments of the disclosure generally relate to wireless communication, and, more particularly, to methods and apparatuses for enhancement to an internet protocol (IP) multimedia subsystem (IMS).

BACKGROUND

This section introduces aspects that may facilitate better understanding of the present disclosure. Accordingly, the statements of this section are to be read in this light and are not to be understood as admissions about what is in the prior art or what is not in the prior art.

The 3rd generation partnership project (3GPP) long term evolution (LTE) standard promises to deliver efficient mobile broadband and multimedia communication services. In keeping with this objective, it was developed to include features needed to effectively support voice-over-IP (VoIP) media and control. Voice-over-LTE (VoLTE) is emerging as a process designed to couple IP multimedia subsystems (IMS) and LTE to create an environment capable of supporting voice traffic in a shared packet data network. Currently VoLTE system support different call types, such as peer to peer (P2P) voice/video call, third-party call and conference via IMS.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to introduce some enhancement to IMS.

According to one aspect of the disclosure, there is provided a method implemented at an application server (AS) of an IMS. The method comprises receiving from a terminal device a first request for initiating a call service and an internet service which are to be integrated with each other. The method further comprises sending a second request for initiating the internet service to a gateway server that acts as a gateway to an internet AS capable of providing the internet service. The method further comprises, in response to a reply from the gateway server, handling the first request based on the reply.

In an embodiment of the disclosure, handling the first request based on the reply comprises, when the reply indicates that the second request has been permitted, controlling a multimedia resource function processor (MRFP) of the IMS such that the call service is integrated with the internet service.

In an embodiment of the disclosure, the MRFP is controlled based on a media model that comprises direction information and model information for the internet service. The direction information indicates, for the internet service, one of: uploading media from the MRFP to the internet AS; downloading media from the internet AS to the MRFP; and a combination of the uploading and the downloading. The model information indicates, for the internet service, one of: mixing media from the call service with media from the internet AS; performing the uploading and/or the downloading for one party of the call service; and performing the uploading and/or the downloading for two parties of the call service.

In an embodiment of the disclosure, the method further comprises obtaining from a home subscriber server (HSS) data related to service subscription of the terminal device. The method further comprises determining from the obtained data whether the terminal device has subscribed to the internet service. The second request is sent after determining that the terminal device has subscribed to the internet service.

In an embodiment of the disclosure, the first request comprises an IMS application reference identifier (IARI) of the internet service.

In an embodiment of the disclosure, the second request comprises a public service identity (PSI) of the internet service and local session description protocol (SDP) information of the IMS.

In an embodiment of the disclosure, the reply from the gateway server comprises SDP information of the internet AS.

According to another aspect of the disclosure, there is provided a method implemented at a gateway server. The method comprises receiving from an AS of an IMS, a second request for initiating an internet service that is to be integrated with a call service. The method further comprises transferring the second request to an internet AS capable of providing the internet service. The method further comprises receiving a reply from the internet AS. The method further comprises transferring the reply to the AS of the IMS.

In an embodiment of the disclosure, the method further comprises performing signaling transformation between the AS of the IMS and the internet AS.

In an embodiment of the disclosure, the method further comprises relaying media between an MRFP of the IMS and the internet AS.

In an embodiment of the disclosure, the second request comprises a PSI of the internet service and local SDP information of the IMS.

In an embodiment of the disclosure, the reply from the internet AS comprises SDP information of the internet AS.

According to another aspect of the disclosure, there is provided a method implemented at an MRFP of an IMS. The method comprises receiving from an application server, AS, of the IMS an instruction for integrating a call service with an internet service. The method further comprises integrating the call service with the internet service based on the instruction.

In an embodiment of the disclosure, the instruction comprises direction information and model information for the internet service. The direction information indicates, for the internet service, one of: uploading media from the MRFP to an internet AS capable of providing the internet service; downloading media from the internet AS to the MRFP; and a combination of the uploading and the downloading. The model information indicates, for the internet service, one of: mixing media from the call service with media from the internet AS; performing the uploading and/or the downloading for one party of the call service; and performing the uploading and/or the downloading for two parties of the call service.

According to another aspect of the disclosure, there is provided a method implemented at a policy and charging rules function (PCRF) entity. The method comprises receiving from a call session control function (CSCF) entity of an IMS, a third request for creating a dedicated bearer for a call service and an internet service which are to be integrated with each other. The method further comprises determining a policy control and charging (PCC) rule based on the third request. The method further comprises creating the dedicated bearer based on the determined PCC rule.

In an embodiment of the disclosure, the third request comprises SDP information of participants of the call service.

According to another aspect of the disclosure, there is provided a method implemented at a terminal device. The method comprises informing one or more internet services that can be integrated with a call service. The method further comprises receiving an indication of an internet service selected from the one or more internet services. The method further comprises sending to an AS of an IMS, a first request for initiating a call service and the selected internet service.

According to another aspect of the disclosure, there is provided an AS of an IMS. The AS comprises at least one processor and at least one memory. The at least one memory contains instructions executable by the at least one processor, whereby the AS is operative to receive from a terminal device a first request for initiating a call service and an internet service which are to be integrated with each other. The AS is further operative to send a second request for initiating the internet service to a gateway server that acts as a gateway to an internet AS capable of providing the internet service. The AS is further operative to, in response to a reply from the gateway server, handle the first request based on the reply.

In an embodiment of the disclosure, the AS is operative to perform the method according to the above aspect.

According to another aspect of the disclosure, there is provided a gateway server. The gateway server comprises at least one processor and at least one memory. The at least one memory contains instructions executable by the at least one processor, whereby the gateway server is operative to receive from an AS of an IMS a second request for initiating an internet service that is to be integrated with a call service. The gateway server is further operative to transfer the second request to an internet AS capable of providing the internet service. The gateway server is further operative to receive a reply from the internet AS. The gateway server is further operative to transfer the reply to the AS of the IMS.

In an embodiment of the disclosure, the gateway server is operative to perform the method according to the above aspect.

According to another aspect of the disclosure, there is provided an MRFP of an IMS. The MRFP comprises at least one processor and at least one memory. The at least one memory contains instructions executable by the at least one processor, whereby the MRFP is operative to receive from an AS of the IMS an instruction for integrating a call service with an internet service. The MRFP is further operative to integrate the call service with the internet service based on the instruction.

In an embodiment of the disclosure, the MRFP is operative to perform the method according to the above aspect.

According to another aspect of the disclosure, there is provided a PCRF entity. The PCRF entity comprises at least one processor and at least one memory. The at least one memory contains instructions executable by the at least one processor, whereby the PCRF entity is operative to receive from a CSCF entity of an IMS a third request for creating a dedicated bearer for a call service and an internet service which are to be integrated with each other. The PCRF entity is further operative to determine a PCC rule based on the third request. The PCRF entity is further operative to create the dedicated bearer based on the determined PCC rule.

In an embodiment of the disclosure, the PCRF entity is operative to perform the method according to the above aspect.

According to another aspect of the disclosure, there is provided a terminal device. The terminal device comprises at least one processor and at least one memory. The at least one memory contains instructions executable by the at least one processor, whereby the terminal device is operative to inform one or more internet services that can be integrated with a call service. The terminal device is further operative to receive an indication of an internet service selected from the one or more internet services. The terminal device is further operative to send to an AS of an IMS a first request for initiating a call service and the selected internet service.

In an embodiment of the disclosure, the terminal device is operative to perform the method according to the above aspect.

According to another aspect of the disclosure, there is provided a system comprising an AS according to the above aspect, a gateway server according to the above aspect, an MRFP according to the above aspect, and a PCRF entity according to the above aspect.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to another aspect of the disclosure, there is provided an AS of an IMS. The AS comprises a reception module for receiving from a terminal device a first request for initiating a call service and an internet service which are to be integrated with each other. The AS further comprises a sending module for sending a second request for initiating the internet service to a gateway server that acts as a gateway to an internet AS capable of providing the internet service. The AS further comprises a handling module for, in response to a reply from the gateway server, handling the first request based on the reply.

According to another aspect of the disclosure, there is provided a gateway server. The gateway server comprises a reception module for receiving from an AS of an IMS a second request for initiating an internet service that is to be integrated with a call service. The gateway server further comprises a transferring module for transferring the second request to an internet AS capable of providing the internet service. The reception module is further used for receiving a reply from the internet AS. The transferring module is further used for transferring the reply to the AS of the IMS.

According to another aspect of the disclosure, there is provided an MRFP of an IMS. The MRFP comprises a reception module for receiving from an AS of the IMS an instruction for integrating a call service with an internet service. The MRFP further comprises an integration module for integrating the call service with the internet service based on the instruction.

According to another aspect of the disclosure, there is provided a PCRF entity. The PCRF entity comprises a reception module for receiving from a CSCF entity of an IMS a third request for creating a dedicated bearer for a call service and an internet service which are to be integrated with each other. The PCRF entity further comprises a determination module for determining a PCC rule based on the third request. The PCRF entity further comprises a creation module for creating the dedicated bearer based on the determined PCC rule.

According to another aspect of the disclosure, there is provided a terminal device. The terminal device comprises an informing module for informing one or more internet services that can be integrated with a call service. The terminal device further comprises a reception module for receiving an indication of an internet service selected from the one or more internet services. The terminal device further comprises a sending module for sending to an AS of an IMS a first request for initiating a call service and the selected internet service.

According to some embodiment(s) of the disclosure, a call service provided by IMS can be integrated with an internet service provided by an external internet application server.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

There are many tools in the Internet which can provide services for people. Many of the tools are very useful if they can be used during a call or a conference. For example, if music was played as the background according to the preference of the parties, it would make people have good mood and improve the user experience. If the caller and the callee communicated in different languages during the call with an interpreter/translator tool, it would make people have barrier-free communication. If the voice was analyzed by the machines to get the speaker's mood and detect the liar, it would be great support for people to do business negotiation via the call or conference. However, the VoLTE system is a closed system which does not have an architecture to integrate with internet services.

The present disclosure introduces some enhancement to IMS. The basic idea is to provide a framework to easily integrate a call/conference with the external internet services from internet application servers. Thus, the internet application server is added as one session ("0.5 party") into the call/conference to provide help to the call/conference participants. Hereinafter, the enhancement will be described in detail with reference to FIGS. 1-9.

Figure 1:
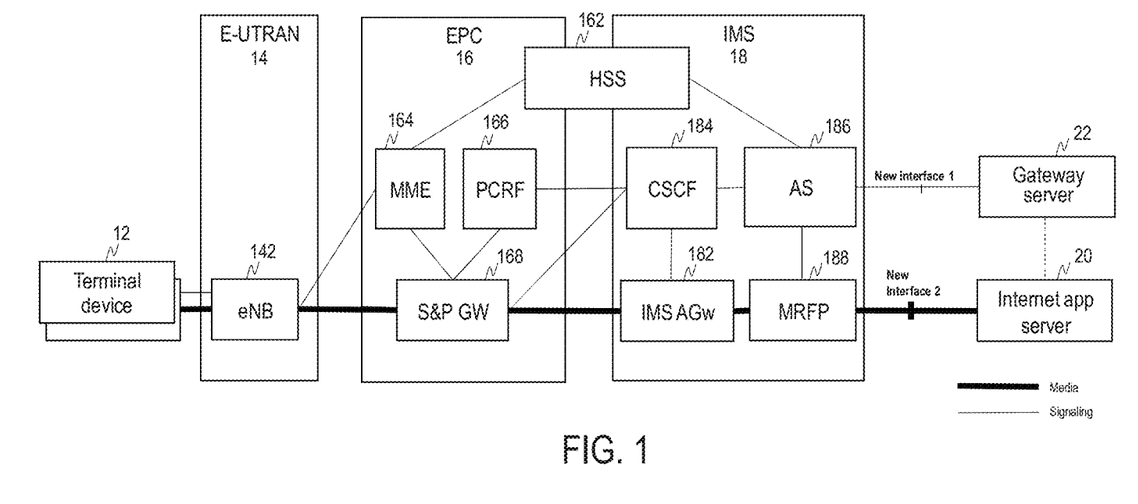
FIG. 1 is a diagram showing an exemplary wireless communication system according to an embodiment of the disclosure.

FIG. 1 is a diagram showing an exemplary wireless communication system according to an embodiment of the disclosure. As shown, the wireless communication system comprises a terminal device 12, an evolved universal mobile telecommunications system (UMTS) terrestrial radio access network (E-UTRAN) 14, an evolved packet core (EPC) 16, an IP multimedia subsystems (IMS) 18, an internet application server 20 and a gateway server 22. Note that the number of each entity shown in FIG. 1 may be more than one.

The terminal device 12 can communicate through a radio access communication link with the E-UTRAN 14. The communication may be performed according to any suitable communication protocols. The terminal device may also be referred to as, for example, mobile station, mobile unit, subscriber station, user equipment (UE), access terminal, or the like. It may refer to any end device that can access a wireless communication network and receive services therefrom. By way of example and not limitation, the terminal device may include portable computers, image capture terminal devices such as digital cameras, gaming terminal devices, music storage and playback appliances, a mobile phone, a cellular phone, a smart phone, a tablet, a wearable device, a personal digital assistant (PDA), or the like.

The E-UTRAN 14 includes an evolved node B (eNB) 142 which can provide radio access communication links to terminal devices that are within its communication service cell, and can control communications between it and the terminal devices. Note that E-UTRAN is merely an exemplary example for illustration purpose. Alternatively or additionally, there may be other radio access networks (RANs) such as a UTRAN, or a global system for mobile communication (GSM)/enhanced data rate for GSM evolution (EDGE) RAN (GERAN). The UTRAN and the GERAN can each include radio network controller (RNC) nodes to control communications through radio base stations providing radio access communication links to terminal devices that are within their respective communication service cells.

The EPC 16 includes a home subscriber server (HSS) 162, a mobility management entity (MME) 164, a policy and charging rules function (PCRF) entity 166 and S&P gateway (GW) 168. The HSS 162 can manage subscriber information of the terminal device 12. The MME 164 can carry out mobility management of the terminal device 12. The PCRF 166 can determine a policy and charging control (PCC) rule to be applied to a service data flow of the terminal device 12. The S&P GW 168 refers to serving gateway (SGW) and packet data network (PDN) gateway (PGW). The SGW can transfer user data packets of the terminal device 12 between the E-UTRAN 14 and the PGW. The PGW can serve as a gateway to an external PDN and provide the terminal device 12 with the connectivity to the external PDN.

The IMS 18 includes an IMS access gateway (IMS AGw) 182, a call session control function (CSCF) entity 184, an application server (AS) 186 and a multimedia resource function processor (MRFP) 188. The IMS AGw 182 is responsible for ensuring that addressing associated with inbound and outbound media streams is correct, which is essentially a network address translation (NAT) function. The CSCF entity 184 includes proxy CSCF (P-CSCF), interrogating CSCF (I-CSCF) and serving CSCF (S-CSCF). The P-CSCF is the entry point to the IMS 18 and can serve as the outbound proxy server for the terminal device 12. The I-CSCF can operate as an inbound session initiation protocol (SIP) proxy server in the IMS 18. The S-CSCF is the main SIP session control node within the IMS 18. The AS 186 can host and execute services. An example of the AS 186 may be an SIP application server for IP telephony and multimedia that enables VoLTE. The MRFP 188 is a media plane node that implements media-related functions.

The internet application server 20 can host and execute internet services. Examples of the internet application server 20 may include streaming media server (e.g., for playing music as the subscriber's preference), a simultaneous interpreter/translator server, or any other server from which internet service(s) can be provided. The gateway server 22 can act as a gateway between the AS 186 of the IMS 18 and the internet application server 20. The gateway server 22 is a node introduced by the present disclosure and may also be referred to as external service gateway server (ESGS) herein. Accordingly, an interface between the AS 186 and the gateway server 22 is added and an interface between the MRFP 188 and the gateway server 22 is added. It is also possible that a new interface is added between the MRFP 188 and the internet application server 20 for media transmission therebetween.

Figure 2:
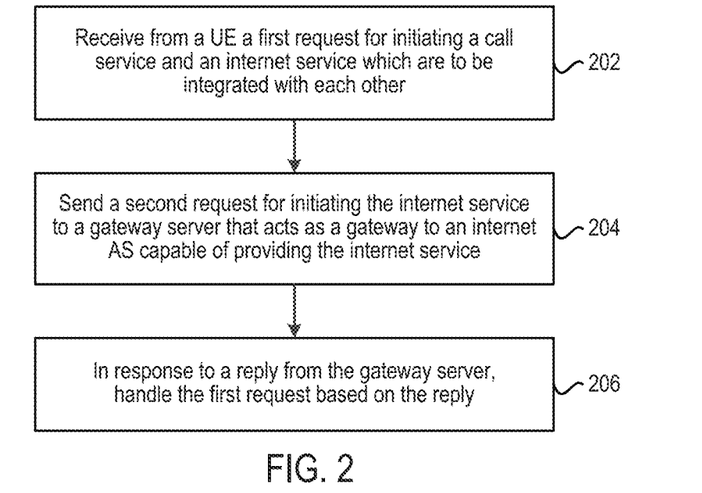
FIG. 2 is a flowchart illustrating a method implemented at an application server according to an embodiment of the disclosure.

FIG. 2 is a flowchart illustrating a method implemented at an application server according to an embodiment of the disclosure. The application server (AS) may be a component of an IMS. At block 202, the AS receives from a terminal device a first request for initiating a call service and an internet service which are to be integrated with each other. The term "call service" may cover a P2P call (which may be simply referred to as "a call" in the present disclosure) service and a conference service. The internet service may refer to a service which is provided by an internet application server (AS) and may be integrated with a call service. Examples of the internet AS may include streaming media server (e.g., for playing music as the subscriber's preference), a simultaneous interpreter/translator server, or the like. The first request may comprise an IMS application reference identifier (IARI) of the internet service. Thus, an IARI may be added for every internet service for service trigger. It may be used by the AS to recognize the requested service/application type. For example, the first request may be an SIP INVITE message.

At block 204, the AS sends a second request for initiating the internet service to a gateway server that acts as a gateway to an internet AS capable of providing the internet service. The second request may comprise a public service identity (PSI) of the internet service such that the gateway server can contact the corresponding internet AS. The PSI of the internet service may be determined based on a predetermined mapping between IARI and PSI. For example, the AS may create a service profile for every IARI. The PSI of the internet service may be a component of the service profile. The second request may further comprise local session description protocol (SDP) information of the IMS. The local SDP information of the IMS may refer to the SDP information provided by the media server (i.e. media resource function (MRF) entity) in the IMS. Note that the second request may further contain other information (such as the identity of the terminal device) if needed. For example, the second request may be an SIP INVITE message. At block 206, in response to a reply from the gateway server, the AS handles the first request based on the reply. The reply from the gateway server may comprise SDP information of the internet AS. For example, the reply may be an SIP 200 OK message. For example, block 206 may be implemented as block 312 or block 314 of FIG. 3, which will be described later.

Figure 3:
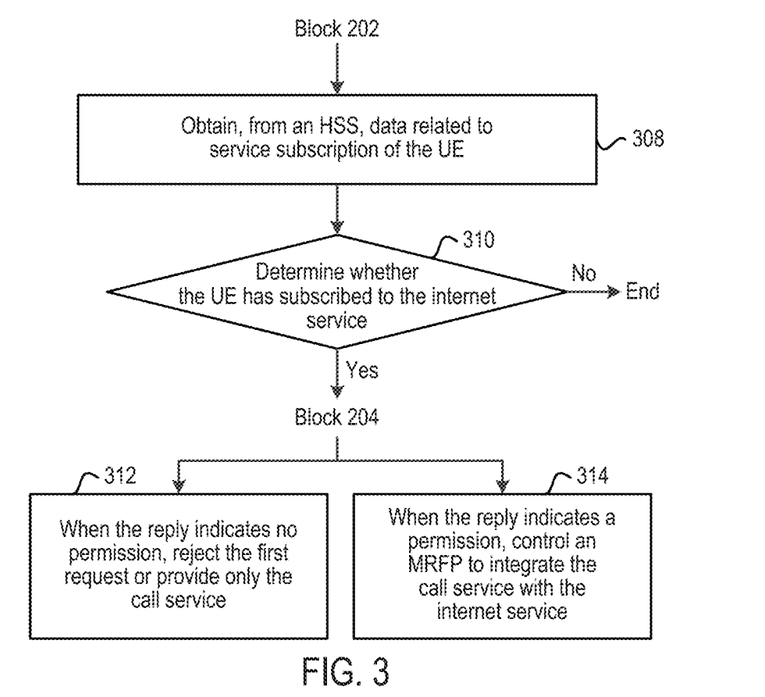
FIG. 3 is a flowchart illustrating a method implemented at an application server according to another embodiment of the disclosure.

FIG. 3 is a flowchart illustrating a method implemented at an AS according to another embodiment of the disclosure. At block 202, the AS receives from a terminal device a first request for initiating a call service and an internet service which are to be integrated with each other. Block 202 has been described above and its details are omitted here. At block 308, the AS obtains, from an HSS, data related to service subscription of the terminal device. Since such data is transparent to the HSS, it may also be referred to as transparent data. At block 310, the AS determines, from the obtained data, whether the terminal device has subscribed to the internet service. If it is determined at block 310 that the terminal device has subscribed to the internet service, the AS sends the second request for initiating the internet service to the gateway server at block 204.

In response to a reply from the gateway server indicating that the second request has not been permitted by the internet AS (e.g. indicated by the status code in the reply), the AS rejects the first request or provides only the call service at block 312. This may depends on the specific application scenario. As an example, if the internet service is a simultaneous interpreter/translator service, the AS may reject the first request since the call service cannot proceed without such interpretation/translation. For instance, the service profile mentioned above may contain service enforcement information. In this example, service enforcement information may indicate "mandatory" for the simultaneous interpreter/translator service. The term "mandatory" means the call service should not continue if the second request has not been permitted. As another example, if the internet service is a music playing service, the AS may provide only the call service since the call service can proceed without such music playing service. In this example, service enforcement information may indicate "optional" for the music playing service. The term "optional" means the call service should continue if the second request has not been permitted.

In response to a reply from the gateway server indicating that the second request has been permitted by the internet AS, the AS controls an MRFP of the IMS at block 314 such that the call service is integrated with the internet service. In this way, the participants of the call service can enjoy internet service(s) during their phone call. The VoLTE system can be reused to provide the session management and media stream management.

The MRFP may be controlled based on a media model. The media model may comprise direction information and model information for the internet service. The direction information may indicate, for the internet service, one of: uploading media from the MRFP to the internet AS; downloading media from the internet AS to the MRFP; and a combination of the uploading and the downloading. The model information may indicate, for the internet service, one of: mixing media from the call service with media from the internet AS; performing the uploading and/or the downloading for one party of the call service; and performing the uploading and/or the downloading for two parties of the call service. For example, the media model may be a component of the service profile mentioned above.

As an exemplary example, the internet service is an interpreter/translator service which is to help the caller and the callee to communicate in different languages during the call. In this case, one party's voice in one language A will be sent to the interpreter/translator server, and be sent back after translation to the other party's language B. Likewise, the other party's voice in the language B will be translated to the language A in the interpreter/translator server and then be sent back. The service profile may be represented as: target PSI: xxx, Direction information: upload & download media, Model information: two party process. As another exemplary example, the internet service is a music room which is to play music to the call participants as if the call participants are talking in a coffee room. The service profile may be represented as: target PSI: xxx, Direction information: only download media, Model information: mix.

Figure 4:
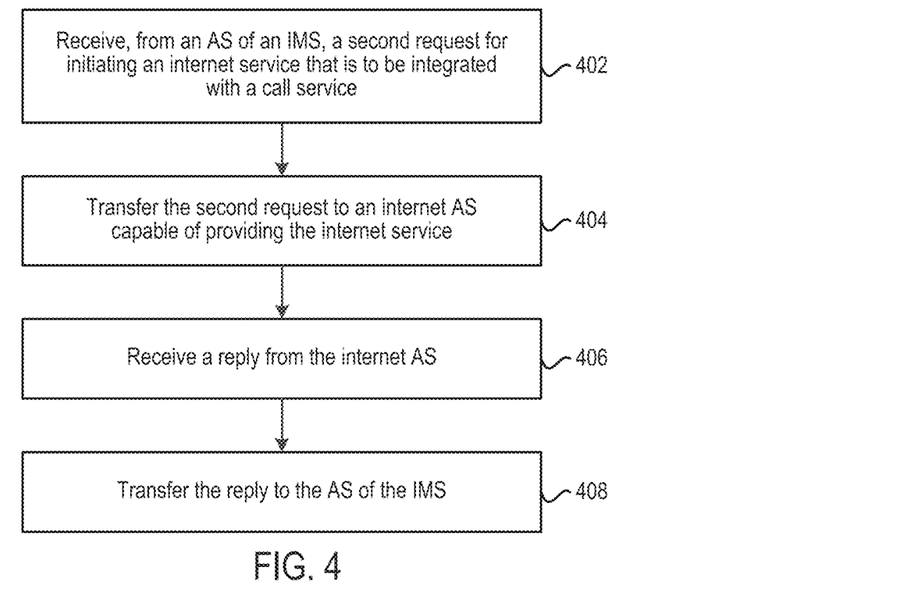
FIG. 4 is a flowchart illustrating a method implemented at a gateway server according to an embodiment of the disclosure.

FIG. 4 is a flowchart illustrating a method implemented at a gateway server according to an embodiment of the disclosure. At block 402, the gateway server receives, from an AS of an IMS, a second request for initiating an internet service that is to be integrated with a call service. Block 402 corresponds to block 204. As described with respect to block 204, the second request may comprise a PSI of the internet service such that the gateway server can contact the corresponding internet AS. The second request may further comprise local session description protocol (SDP) information of the IMS and other information (such as the identity of the terminal device) if needed. At block 404, the second request is transferred (or relayed) to an internet AS capable of providing the internet service. Since different internet AS may employ different protocols related to the internet services, the gateway server may contact the internet AS by using the corresponding protocol. At block 406, a reply is received from the internet AS. For example, as described above, the reply from the internet AS may comprise SDP information of the internet AS. The reply may indicate (e.g. via a status code) whether the second request has been permitted by the internet AS. At block 408, the reply is transferred (or relayed) to the AS of the IMS.

As an example, the AS of the IMS supports SIP while the internet AS exposes the internet service as Web service (e.g. RESTful Web API) and does not support SIP. In this case, the method implemented at the gateway server may further include performing signaling transformation between the AS of the IMS and the internet AS. As another example, an MRFP in the IMS is not directly accessible/inter-exchangeable with the internet AS. In this case, the method implemented at the gateway server may further include relaying media (or user plane traffic) between the MRFP of the IMS and the internet AS.

Figure 5:
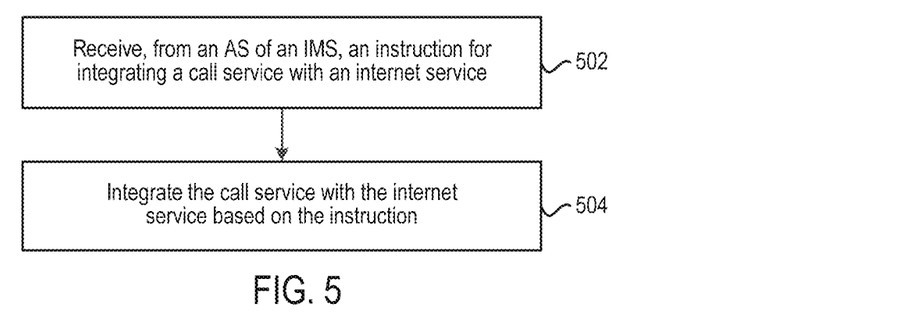
FIG. 5 is a flowchart illustrating a method implemented at an MRFP according to an embodiment of the disclosure.

FIG. 5 is a flowchart illustrating a method implemented at an MRFP according to an embodiment of the disclosure. The MRFP may be a component of an IMS. At block 502, the MRFP receives, from an AS of the IMS, an instruction for integrating a call service with an internet service. The instruction may comprise direction information and model information for the internet service, as described with respect to block 314. The direction information may indicate, for the internet service, one of: uploading media from the MRFP to an internet AS capable of providing the internet service; downloading media from the internet AS to the MRFP; and a combination of the uploading and the downloading. The model information may indicate, for the internet service, one of: mixing media from the call service with media from the internet AS; performing the uploading and/or the downloading for one party of the call service; and performing the uploading and/or the downloading for two parties of the call service. As an example, the MRFP may be controlled by the AS of the IMS via media gateway control protocol (MEGACO). The direction information may be indicated by commands such as SendReceive, SendOnly, or ReceiveOnly. If the AS wants the MRFP to mix some media streams, the AS may put them into one context, which corresponds to the model information. At block 504, the MRFP integrates the call service with the internet service based on the instruction. For example, the MRFP can be controlled to do the media mix/retransmission based on the media model contained in the instruction.

Figure 6:
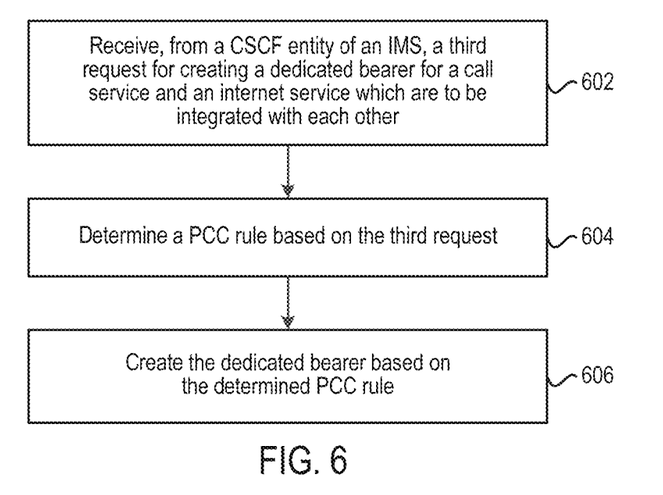
FIG. 6 is a flowchart illustrating a method implemented at a PCRF entity according to an embodiment of the disclosure.

FIG. 6 is a flowchart illustrating a method implemented at a PCRF entity according to an embodiment of the disclosure. At block 602, the PCRF entity receives, from a CSCF entity of an IMS, a third request for creating a dedicated bearer for a call service and an internet service which are to be integrated with each other. The third request may comprise SDP information of participants of the call service. For example, the third request may be an authentication authorization request (AAR) message. At block 604, a PCC rule is determined based on the third request. For example, there may be multiple predetermined PCC rules. The PCC rule may be selected from the multiple PCC rules based on the SDP information contained in the third request. Note that since the bandwidth provided by the dedicated bearer for audio call in VoLTE may not satisfy the requirement of some internet service(s), new types of PCC rule may be added in the PCRF entity to satisfy the quality of service (QoS) of different internet service. Take the music room for example. In order to play high definition (HD) music to the call participants, new PCC rule is needed. Compared with the normal voice call, the new PCC rule provides higher guaranteed bit rate/maximum bit rate (GBR/MBR) for downlink (DL), and the GBR/MBR for uplink (UL) keeps the same. At block 606, the dedicated bearer is created based on the determined PCC rule. Various existing procedures may be used to implement block 606.

Figure 7:
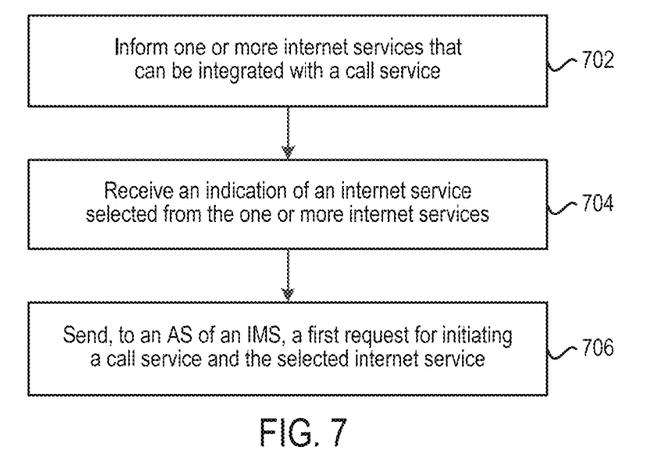
FIG. 7 is a flowchart illustrating a method implemented at a terminal device according to an embodiment of the disclosure.

FIG. 7 is a flowchart illustrating a method implemented at a terminal device according to an embodiment of the disclosure. At block 702, the terminal device informs one or more internet services that can be integrated with a call service. For example, when a user makes a call or initiate a conference, a visual or audible message about the one or more internet services may be provided to the user. In the case of visual message, a user interface (UI) may be provided on the terminal device for choosing the internet service(s). Via the UI, the user can decide whether to use internet service(s) during the call service and which internet service(s) to be used. The association between a call service and internet service(s) may be predefined in the terminal device. Optionally, different internet service(s) may be associated with different call service(s). As an exemplary example, the service selection UI shown to the user may be as follows:

Please select the internet service(s) you need in this call.
Music Room
Interpret Translator
Lier Detector At block 704, the terminal device receives an indication of an internet service selected from the one or more internet services. For example, the indication may be input by the user by using various ways such as touch input, voice input, or the like. At block 706, the terminal device sends, to an AS of an IMS, a first request for initiating a call service and the selected internet service. For example, when any internet service(s) are selected, the IARI representing the selected internet service(s) may be carried in the message sent by the terminal device to the AS for call/conference establishment. Block 706 corresponds to block 202 and its further details are omitted here.

Figure 8:
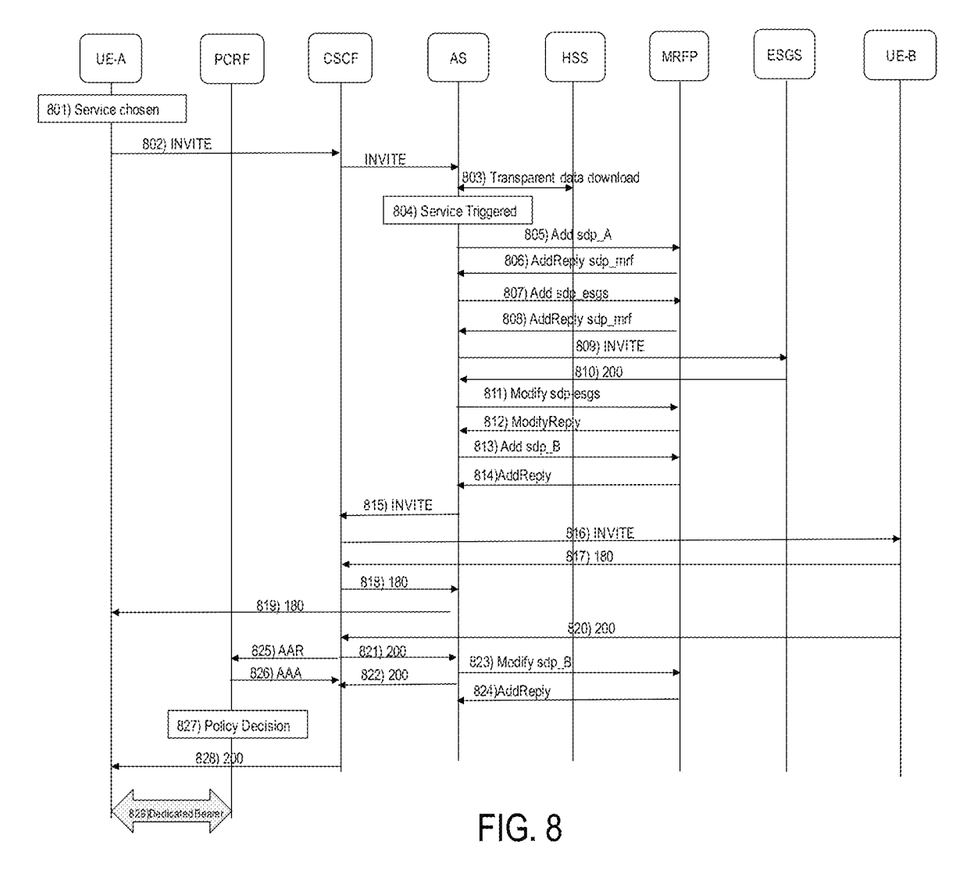
FIG. 8 is a flowchart illustrating an exemplary process according to an embodiment of the disclosure.

FIG. 8 is a flowchart illustrating an exemplary process according to an embodiment of the disclosure. At block 801, when a user tries to make a call/conference, the UE-A pops up a UI showing the corresponding internet service(s) for the user to select. After the user's selection and confirmation, the UE-A sends an INVITE message at block 802 to initiate the call/conference. The INVITE message includes the IARI of the selected internet service. For example, the IARI may take the form of a feature-tag represented as:

+g.3gpp.iari-ref="urn%3Aurn-7%3A3gpp-application.ims.iari.intepretor".

The INVITE message is sent to the AS via the CSCF. At block 803, the AS downloads the transparent data from the HSS. At block 804, the AS may detect the feature-tag IARI in the INVITE message and detect, from the transparent data, that the UE-A has subscribed to the service of the received IARI. Then the AS may trigger the service.

At block 805, the AS issues Add to the MRFP for the UE-A by sending "Add sdp_A" to the MRFP. At block 806, the MRFP sends a response "AddReply sdp_mrf" to the AS. At block 807, the AS issues Add to the MRFP for the ESGS by sending "Add sdp_esgs" to the MRFP. At block 808, the MRFP sends a response "AddReply sdp_mrf" to the AS. In this way, the AS gets the SDP of the MRFP side by sending ADD to the MRFP.

Note that the AS may control the MRFP to do media mix/retransmission based on the media model. It may mean that the audio/video from the caller/callee can be sent to the internet application server which may do some processing on it and send back some media as output. Then the output may be sent to the call participants. Or the internet application server may just play media to the call/conference participants. Thus, the AS provides the service logic to control the create/modify/close of the two and a half parties' session.

At block 809, the AS may find the service profile for the received IARI and request the service to the ESGS by using the target PSI in the service profile. The request sent to the ESGS further contains the local SDP (the MRFP's SDP) and the UE-A's public identity. In this way, the ESGS can contact the internet application server of the target PSI and get a reply having remote SDP (in case the status code of the reply is success) or other information (e.g. some failure information in case the status code of the reply is failure). Then, the ESGS may reply to the AS at block 810, with the remote SDP or other information it has received from the internet application server. For example, the reply may be a 200 OK message.

At block 811, the AS issues Modify to the MRFP for the ESGS by sending "Modify sdp_esgs" to the MRFP. At block 812, the MRFP sends a response "ModifyReply" to the AS. In this way, the AS informs the remote SDP to the MRFP. At block 813, the AS issues Add to the MRFP for the UE-B by sending "Add sdp_B" to the MRFP. At block 814, the MRFP sends a response "AddReply" to the AS.

At block 815, the AS sends an INVITE message to the CSCF. At block 816, the CSCF sends an INVITE message to the UE-B. At block 817, the UE-B sends a 180 Ringing message to the CSCF. At block 818, the CSCF sends a 180 Ringing message to the AS. At block 819, the AS sends a 180 Ringing message to the UE-A. At block 820, the UE-B sends a 200 OK message to the CSCF. In this way, the CSCF gets the SDP of the UE-B. At block 821, the CSCF may send a 200 OK message to the AS. At block 822, the AS sends a 200 OK message to the CSCF. At block 823, the AS issues Modify to the MRFP for the UE-B by sending "Modify sdp_B" to the MRFP. At block 824, the MRFP sends a response "ModifyReply" to the AS. In this way, the AS informs the UE-B's SDP to the MRFP. At block 825, the CSCF (e.g. P-CSCF) sends an authentication authorization request (AAR) message to the PCRF with the IP address, port, media type and bandwidth from the SDP of the UE-A and the UE-B. At block 826, the PCRF sends an authentication authorization answer (AAA) message to the CSCF.

At block 827, the PCRF may decide the PCC rule from the information received in the AAR, mainly from the bandwidth. For example, in case the internet service is music room service, the PCRF may do the policy decision from SIP signaling and the SDP. When the originating UE-A requests a voice call, the PCRF may know from the SIP signaling that a voice call is requested. The PCRF may know from the SDP that the call needs HD voice for music. Then the PCRF may determine a new PCC rule. At block 828, the CSCF sends a 200 OK message to the UE-A. At block 829, the dedicated bearer for the UE-A is created based on the new PCC rule.

Figure 9:
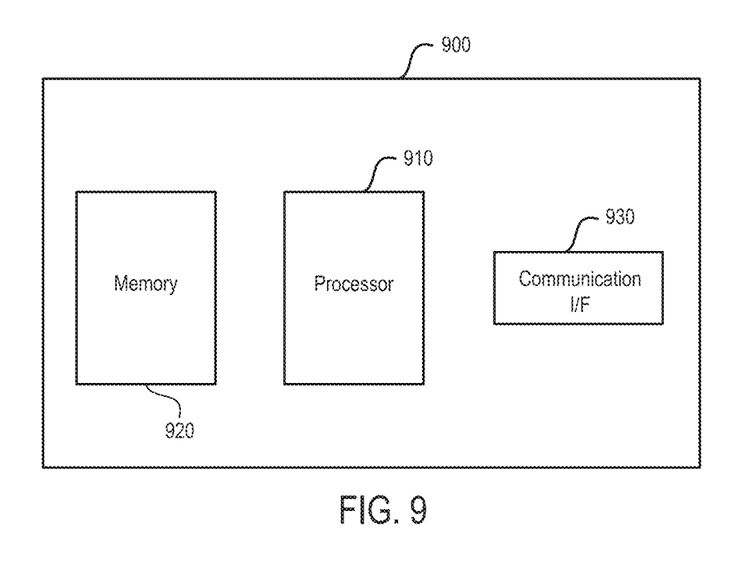
FIG. 9 is a block diagram showing an apparatus suitable for use in practicing some embodiments of the disclosure.

FIG. 9 is a block diagram showing an apparatus suitable for use in practicing some embodiments of the disclosure. For example, any one of the AS, the gateway server, the MRFP, the PCRF entity and the terminal device described above may be implemented through the apparatus 900. As shown, the apparatus 900 may include a processor 910, a memory 920 that stores a program, and a communication interface 930 for communicating data with other external devices through wired and/or wireless communication.

The program includes program instructions that, when executed by the processor 910, enable the apparatus 900 to operate in accordance with the embodiments of the present disclosure, as discussed above. That is, the embodiments of the present disclosure may be implemented at least in part by computer software executable by the processor 910, or by hardware, or by a combination of software and hardware.

The memory 920 may be of any type suitable to the local technical environment and may be implemented using any suitable data storage technology, such as semiconductor based memory devices, flash memory, magnetic memory devices and systems, optical memory devices and systems, fixed memory and removable memory. The processor 910 may be of any type suitable to the local technical environment, and may include one or more of general purpose computers, special purpose computers, microprocessors, digital signal processors (DSPs) and processors based on multi-core processor architectures, as non-limiting examples.

As another embodiment, the AS may comprise a reception module, a sending module and a handling module. The reception module may be configured to receive, from a terminal device, a first request for initiating a call service and an internet service which are to be integrated with each other, as described above with respect to block 202. The sending module may be configured to send a second request for initiating the internet service to a gateway server that acts as a gateway to an internet AS capable of providing the internet service, as described above with respect to block 204. The handling module may be configured to, in response to a reply from the gateway server, handle the first request based on the reply, as described above with respect to block 206.

As another embodiment, the gateway server may comprise a reception module and a transferring module. The reception module may be configured to receive, from an AS of an IMS, a second request for initiating an internet service that is to be integrated with a call service, as described above with respect to block 402. The transferring module may be configured to transfer the second request to an internet AS capable of providing the internet service, as described above with respect to block 404. The reception module may be further configured to receive a reply from the internet AS, as described above with respect to block 406. The transferring module may be further configured to transfer the reply to the AS of the IMS, as described above with respect to block 408.

As another embodiment, the MRFP may comprise a reception module and an integration module. The reception module may be configured to receive, from an AS of an IMS, an instruction for integrating a call service with an internet service, as described above with respect to block 502. The integration module may be configured to integrate the call service with the internet service based on the instruction, as described above with respect to block 505.

As another embodiment, the PCRF entity may comprise a reception module, a determination module and a creation module. The reception module may be configured to receive, from a CSCF entity of an IMS, a third request for creating a dedicated bearer for a call service and an internet service which are to be integrated with each other, as described above with respect to block 602. The determination module may be configured to determine a PCC rule based on the third request, as described above with respect to block 604. The creation module may be configured to create the dedicated bearer based on the determined PCC rule, as described above with respect to block 606.

As another embodiment, the terminal device may comprise an informing module, a reception module and a sending module. The informing module may be configured to inform one or more internet services that can be integrated with a call service, as described above with respect to block 702. The reception module may be configured to receive an indication of an internet service selected from the one or more internet services, as described above with respect to block 704. The sending module may be configured to send, to an AS of an IMS, a first request for initiating a call service and the selected internet service, as described above with respect to block 706. Note that the modules described above may be implemented as hardware (such as integrated circuits, field programmable gate arrays (FPGA), or the like), software, or a combination thereof.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a multimedia resource function processor (MRFP) of an internet protocol (IP) multimedia subsystem (IMS), the method comprising:
  receiving, from an application server (AS) of the IMS, an instruction for integrating a call service with an internet service, wherein the instruction comprises direction information for the internet service indicating a direction for media relative to an internet AS capable of providing the internet service, and model information for the internet service indicating how the MRFP is to integrate the media; and
  integrating the call service with the internet service based on the instruction.

2. The method of claim 1,
wherein the direction information indicates, for the internet service:
  uploading the media from the MRFP to the internet AS capable of providing the internet service;
  downloading the media from the internet AS to the MRFP; or
  a combination of the uploading and the downloading the media; and
wherein the model information indicates, for the internet service:
  mixing media from the call service with the media downloaded from the internet AS;
  performing the uploading and/or the downloading of the media for one party of the call service; or
  performing the uploading and/or the downloading of the media for two parties of the call service.

3. The method of claim 2 wherein the direction information is indicated by at least one of:
  a SendReceive command;
  a SendOnly command; and
  a ReceiveOnly command.

4. The method of claim 2 wherein to integrate the call service with the internet service based on the instruction, the MRFP is controlled to mix the media from the call service with the media from the internet AS based on a media model comprised in the instruction.

5. The method of claim 2 wherein to integrate the call service with the internet service based on the instruction, the MRFP is controlled to retransmit the media based on a media model comprised in the instruction.

6. The method of claim 1 wherein the MRFP is controlled by the AS of the IMS via a media gateway control protocol (MEGACO).

7. A multimedia resource function processor (MRFP) of an internet protocol (IP) multimedia subsystem (IMS), the MRFP comprising:
  processing circuitry; and
  memory comprising instructions executable by the processing circuitry, whereby the MRFP is configured to:
    receive, from an application server (AS) of the IMS, an instruction for integrating a call service with an internet service, wherein the instruction comprises direction information for the internet service indicating a direction for media relative to an internet AS capable of providing the internet service, and model information for the internet service indicating how the MRFP is to integrate the media; and
  integrate the call service with the internet service based on the instruction.

8. The MRFP of claim 7,
wherein the direction information indicates, for the internet service:
  uploading the media from the MRFP to the internet AS capable of providing the internet service;
  downloading the media from the internet AS to the MRFP; or
  a combination of the uploading and the downloading the media; and
wherein the model information indicates, for the internet service:
  mixing media from the call service with the media from the internet AS;
  performing the uploading and/or the downloading of the media for one party of the call service; or
  performing the uploading and/or the downloading of the media for two parties of the call service.

9. The MRFP of claim 8 wherein the direction information is indicated by at least one of:
  a SendReceive command;
  a SendOnly command; and
  a ReceiveOnly command.

10. The MRFP of claim 8 wherein to integrate the call service with the internet service based on the instruction, the MRFP is configured to mix the media from the call service with the media from the internet AS based on a media model comprised in the instruction.

11. The MRFP of claim 8 wherein to integrate the call service with the internet service based on the instruction, the MRFP is configured to retransmit the media based on a media model comprised in the instruction.

12. The MRFP of claim 7 wherein the MRFP is controlled by the AS of the IMS via a media gateway control protocol (MEGACO).

13. A non-transitory computer readable medium storing computer program code thereon that, when executed by processing circuitry of a multimedia resource function processor (MRFP) of an internet protocol (IP) multimedia subsystem (IMS), causes the MRFP to:
  receive, from an application server (AS) of the IMS, an instruction for integrating a call service with an internet service, wherein the instruction comprises direction information for the internet service indicating a direction for media relative to an internet AS capable of providing the internet service, and model information for the internet service indicating how the MRFP is to integrate the media; and
  integrate the call service with the internet service based on the instruction.

14. The non-transitory computer readable medium of claim 13,
- wherein the direction information indicates, for the internet service:
  - uploading the media from the MRFP to the internet AS capable of providing the internet service;
  - downloading the media from the internet AS to the MRFP; or
  - a combination of the uploading and the downloading the media; and
- wherein the model information indicates, for the internet service:
  - mixing media from the call service with the media from the internet AS;
  - performing the uploading and/or the downloading of the media for one party of the call service; or
  - performing the uploading and/or the downloading of the media for two parties of the call service.

15. The non-transitory computer readable medium of claim 14 wherein the direction information is indicated by at least one of:
- a SendReceive command;
- a SendOnly command; and
- a ReceiveOnly command.

16. The non-transitory computer readable medium of claim 14 wherein to integrate the call service with the internet service based on the instruction, the MRFP is further caused to mix the media from the call service with the media from the internet AS based on a media model comprised in the instruction.

17. The non-transitory computer readable medium of claim 14 wherein to integrate the call service with the internet service based on the instruction, the MRFP is further caused to retransmit the media based on a media model comprised in the instruction.

18. The non-transitory computer readable medium of claim 13 wherein the MRFP is controlled by the AS of the IMS via a media gateway control protocol (MEGACO).

* * * * *